Figure 1:
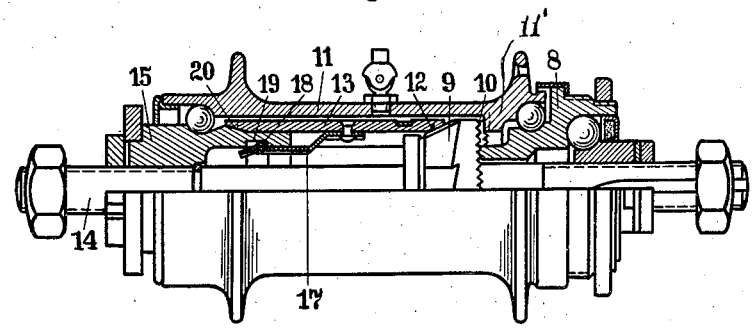

April 16, 1935. F. WINKLER 1,998,213
INTERNAL HUB BRAKE FOR CYCLES
Filed Jan. 23, 1934 3 Sheets-Sheet 1

Inventor
Franz Winkler
by
Dean Fairbank Hiede Fortu

April 16, 1935.　　　F. WINKLER　　　1,998,213
INTERNAL HUB BRAKE FOR CYCLES
Filed Jan. 23, 1934　　　3 Sheets-Sheet 2

Inventor
Franz Winkler
by
Dean Fairbank Hirsch & Foster

April 16, 1935.  F. WINKLER  1,998,213

INTERNAL HUB BRAKE FOR CYCLES

Filed Jan. 23, 1934  3 Sheets-Sheet 3

Inventor
Franz Winkler
by
Dean Fairbank Hirsch & Foster

Patented Apr. 16, 1935

1,998,213

UNITED STATES PATENT OFFICE 1,998,213

INTERNAL HUB BRAKE FOR CYCLES

Franz Winkler, Schweinfurt, Germany

Application January 23, 1934, Serial No. 707,865
In Germany January 26, 1933

9 Claims. (Cl. 192—6)

The invention relates to internal hub brakes for cycles, especially of that type in which a cylindrical tubular brake composed of a number of sectors can be expanded and applied to the interior face of the hub shell by means of conical expanding members intentionally forced into the tubular brake from both its ends.

The object of the invention is to provide special and separate means for elastically supporting the single sector-like brake parts, which means are so devised as to permit of the expanding movement of the said brake parts but are also capable of automatically replacing and securing said parts in their inoperative positions.

This object is attained by the provision of separate resilient or springy supporting elements which not only fix the brake parts in a neutral position when not applied but also form the connection of the said brake parts with an expanding cone member, preferably the stationary one.

Another object of the invention is so to devise the said resilient interconnection elements that the brake parts are not prevented from being displaced lengthwise with respect to the expanding cones and, on the other hand, will, owing to their elasticity, draw the brake parts inwardly on the cones and place them against rigid rests.

Other objects will be disclosed by the following specification.

In the accompanying drawings, which form a part of this specification, by way of examples several embodiments of the internal hub brake according to the invention are represented. In the drawings—

Figure 2:
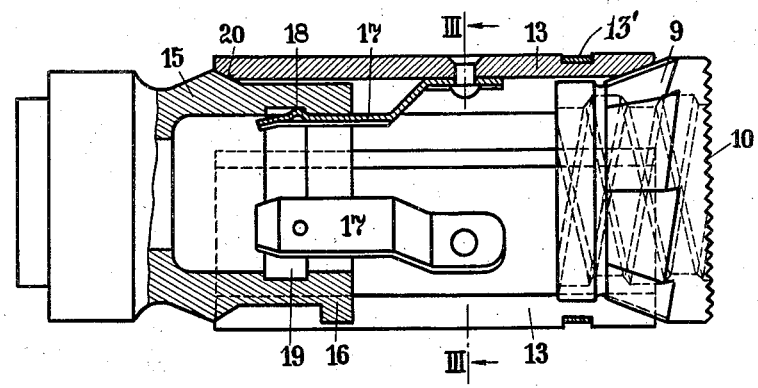
Figure 3:
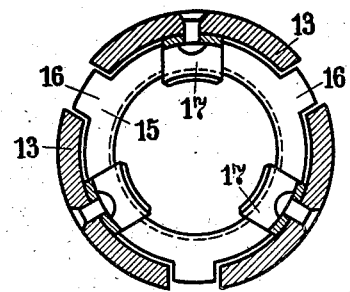
Figure 4:
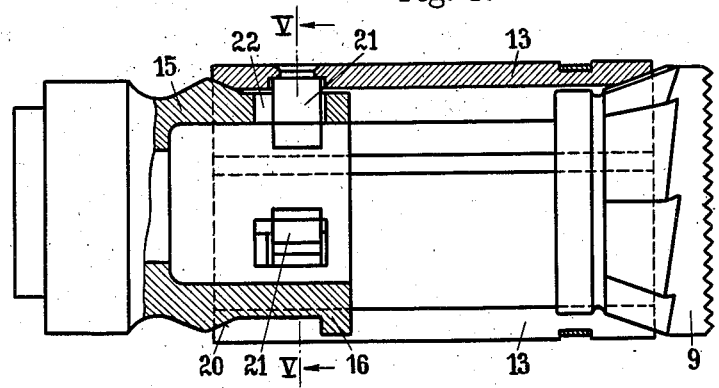
Figure 5:
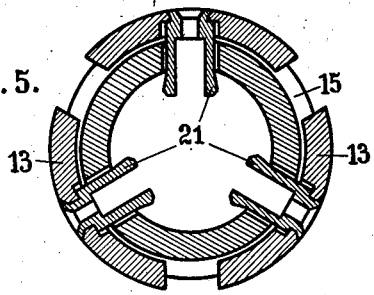
Figure 6:
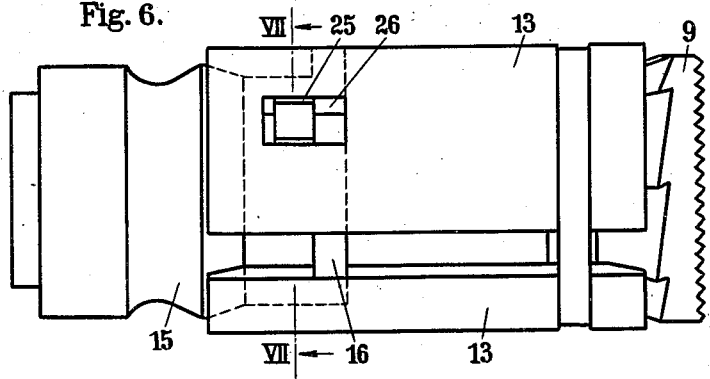
Figure 7:
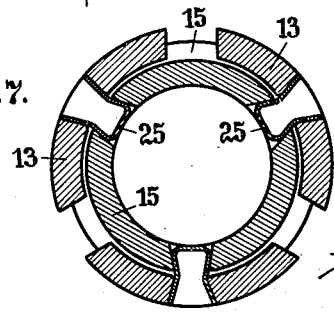

Fig. 1 is partly a longitudinal section, partly a side elevation of the first embodiment of a free-wheel coaster-brake, Fig. 2 shows the brake proper with its expanding members, on a larger scale, partly in section, Fig. 3 is a cross section on line III—III of Fig. 2, Fig. 4 is a longitudinal section of the second embodiment, Fig. 5 shows a cross section thereof on line V—V of Fig. 4, Fig. 6 is a side elevation of the third embodiment, Fig. 7 is a cross section thereof on line VII—VII of Fig. 6.

Figure 8:
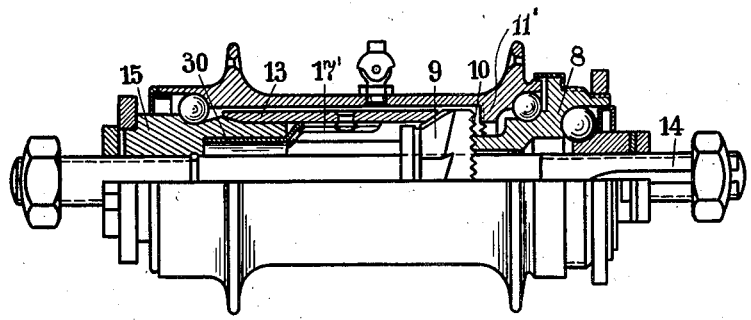
Figure 9:
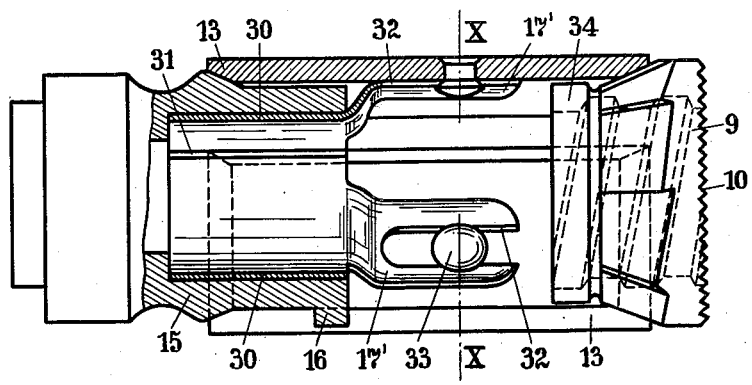
Figure 10:
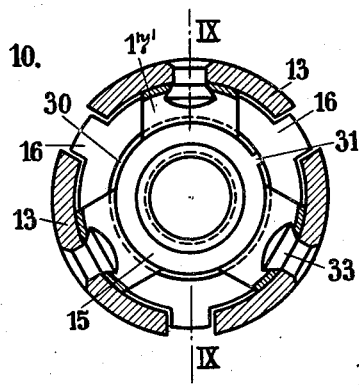

Fig. 8 shows a fourth embodiment partly in a longitudinal section, partly as a side elevation, Fig. 9 shows the brake proper on an enlarged scale as a longitudinal section on line IX—IX of Fig. 10, and Fig. 10 shows a cross section on line X—X of Fig. 9.

Like numerals designate like or similar parts throughout all figures of the drawings.

Referring to the first embodiment of the invention, the free-wheel coaster-hub shown as a whole by Fig. 1 is of the type in which on a driver 8 can be screwed a conical coupling sleeve 9 which carries the driving and free-wheeling coupling 10 having a serrated end facing similar serrations in an inward flange 11' of the hub shell 11 as shown in Figs. 1 and 8, and a conical claw coupling 12 having ratchet teeth for connection with the brake. The cylindric brake housed within the hub shell 11 comprises, e. g., three cheeks or brake shoes 13 which are internally tapered at either end and adapted to engage the coupling sleeve 9 by means of corresponding conical teeth 12 while their other ends bear against a conical face 20 of a stationary member 15 fastened to the axle 14. The brake is guided in a lengthwise relation by lugs 16 projecting from the circumference of the member 15 and at the same time secured by them against angular displacement on the periphery of the said member 15.

To the inside face of each of the brake cheeks 13 is riveted or otherwise fixed a spring 17 at one of its ends; the said springs engaging with their free ends the central bore of the member 15 and with a locking projection 18 a peripheral groove 19 provided in the said bore of the member 15 and which affords a definite axial clearance to the said projection 18 so that the cheeks may be displaced axially on the conical surface 20. But by this springy safety device they are also yieldingly connected with the member 15.

The free-wheel coaster-brake works as follows:—

When the operator desires to move forward under power, the driver 8 is rotated so that the coupling sleeve 9 is screwed to the right as shown in Fig. 1 to move the serrated end of the coupling 9 into engagement with the corresponding serrations in the inward flange 11' of the hub shell 11, so that this hub shell and the driver are connected for driving. During free-wheeling the coupling sleeve 9 is displaced to the left so that the driving coupling between the hub shell 11 and the driver 8 is disengaged. By back-pedalling far enough the sleeve 9 can further be screwed towards the member 15 until the cheeks are radially moved apart and pressed against the inside surface of the hub shell 11, the springs 17 yielding correspondingly. When released by the expanding cones, the cheeks 13 will be drawn radially inwardly by the springs 17 and held against contact with the hub shell.

If desired, an annular spring 13' may be provided encircling the cheeks or brake shoes 13. However, this spring 13' is not necessary since the individual spring members 17 are sufficient to yieldably hold the cheeks 13 in brake released position or against the member 15 and coupling 9 during braking position.

In the embodiment shown by Figs. 4 and 5, the springs 17 are replaced by U-shaped springs 21 which are riveted to the inside of the cheeks 13. With their legs or flanges the said springs extend into longitudinal slots 22 of the member 15, which allow for a longitudinal displacement of the cheeks, the springs 21 thereby sliding in the longitudinal slots and the springiness of the flanges thereof permitting of tight bearing of the edges of the cheeks against the lugs 16.

In the embodiment shown in Figs. 6 and 7, U-shaped springs 25, the apex of which is held in recesses of the member 15, engage with their flanges into longitudinal slots of the cheeks 13 and so allow an axial displacement of the same.

With this connection between the brake cheeks and the stationary expanding cone 15 the easy movement of the several parts is assured for the application of the brake. Nevertheless the connection between the several parts is always maintained so that the brake forms a self-contained unit.

In the embodiment according to Figs. 8 to 10, the bent tongues 17' carrying the cheeks 13, and their carrier 30 are preferably stamped from one piece of sheet metal which is so bent into a cylinder that the slot 31 left of the cylindrical springy carrier 30 permits of the said carrier bearing against the bore of the cone 15. The free ends of the tongues 17' are provided with longitudinal slots 32 adapted to receive projections, such as heads of rivets 33 which are fastened in the middle of the cheeks. This connection holds the cheeks safely together. On account of this supporting the cheeks are allowed to be displaced lengthwise and to be moved outwards on the expanding members; but by the springy tongues 17' they are brought back inwards into their neutral position in which they bear with slight friction against the cylindrical periphery 34 of the slidable coupling member 9 so as to form a frictional retaining member.

The brake of the described construction results in various advantages. The arrangement of the slotted carrying sleeve 30 within the bore of the stationary cone 15 allows of the cheeks bearing against the guiding lugs 16 and the whole springy carrying set can be readily made of sheet metal by stamping. The brake is easy to assemble as the rivet heads 33 can be introduced into the slots 32 from the open ends thereof.

What I claim is—

1. In an internal brake for cycle hubs, the combination with a hub shell, of a wheel axle, a brake-expanding member stationarily mounted on said axle and within the hub shell, lugs projecting from the periphery of the brake-expanding member, brake cheeks being located with one of their ends round the brake-expanding member and spaced from each other by the lugs, a number of resilient means arranged internally of the cheeks and singly interconnecting the cheeks with the brake-expanding member, and a second brake-expanding member engaging between the other ends of the cheeks and being shiftable along the wheel axle.

2. The combination with a hub shell, of a wheel axle, a driving element, a conical sleeve engaged with the driving element by screw threads, a free wheel coupling between the conical sleeve and the hub shell, a hollow cylindric brake composed of cheeks, a brake-supporting member stationarily mounted on the wheel axle and adapted to expand the brake at one end, guides for the cheeks projecting from the periphery of the brake-supporting member and engaging between the single cheeks, a coupling arranged between the cheeks and the said conical sleeve, which sleeve engages the other end of the brake, and single resilient means which separately interconnect the cheeks with the stationary brake-supporting member.

3. In an internal brake for cycle hubs, the combination with a hollow cylindric brake composed of a number of cheeks, of a stationary brake-expanding member, lugs arranged on said brake-expanding member for axially and radially guiding the single cheeks, a second brake-expanding member being axially shiftable, the two brake-expanding members interengaging the ends of the hollow brake from opposite ends, and resilient means located within the brake and singly interconnecting the cheeks with the said stationary brak-expanding member, a definite axial free play being provided in the said interconnection.

4. In an internal brake for cycle hubs, the combination with a stationary brake-expanding member, of a shiftable brake-expanding member, the said two brake-expanding members having conical faces, a brake composed of cheeks disposed around the two brake-expanding members, and resilient means tending to hold the cheeks against the periphery of the two brake-expanding members and separately interconnecting the single cheeks with the stationary brake-expanding member, recesses being provided in the interconnection for axial displacement of the cheeks.

5. In an internal brake for cycle hubs, the combination with a hollow cylindric brake composed of cheeks, of a stationary brake-expanding member having a central bore, a second brake-expanding member shiftable towards the stationary brake-expanding member, a cylindric springy sleeve sprung in the central bore of the stationary brake-expanding member, and resilient tongues supported by the said springy sleeve and each connected to a single cheek with a definite axial play between them, the said tongues tending to hold the cheeks against the periphery of the two brake-expanding members.

6. In an internal brake for cycle hubs, the combination comprising a cylindrical hollow brake member, composed of a number of cheeks, a stationary member, a shiftable member adapted to expand the said brake member into braking position and against the periphery of said stationary member, and a separate resilient means for each of said cheeks and capable of holding the same against the peripheries of the said stationary and shiftable brake expanding members in braking position.

7. In an internal brake for cycle hubs, the combination with a stationary brake-expanding cone, of a shiftable brake-expanding cone, brake cheeks disposed around the said brake-expanding cones, and separate resilient means each engaged with the said stationary brake-expanding cone and with one of said cheeks, thus allowing axial and radial displacement of said brake cheeks during braking.

8. In an internal brake for cycle hubs, the combination with a hollow cylindrical brake composed of a number of cheeks, of a stationary brake-expanding member having lugs for axially and radially guiding the cheeks, a second brake-expanding member shiftable towards the stationary brake-expanding member, and separate resilient means for each cheek tending to hold the cheeks singly against the peripheries of the said two brake-expanding members.

9. An internal hub brake for a cycle, including a hollow hub, a plurality of brake shoes in the interior of said hub, a stationary member in said hub, means for expanding said brake shoes into engagement with said hub and for moving said brake shoes into engagement with said stationary member, whereby said hub is braked, and separate resilient means for each of said brake shoes for holding said shoes against said stationary member during braking position, and for returning said shoes into non-braking position upon the release of said expanding means.

FRANZ WINKLER.